US011984059B2

(12) United States Patent
Otsuka (10) Patent No.: US 11,984,059 B2
(45) Date of Patent: May 14, 2024

(54) DISPLAY CONTROL APPARATUS, TRANSMISSION APPARATUS, DISPLAY CONTROL METHOD, AND PROGRAM

(71) Applicant: Sony Interactive Entertainment Inc., Tokyo (JP)

(72) Inventor: Katsushi Otsuka, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 215 days.

(21) Appl. No.: 17/627,908

(22) PCT Filed: Sep. 8, 2020

(86) PCT No.: PCT/JP2020/033984
§ 371 (c)(1),
(2) Date: Jan. 18, 2022

(87) PCT Pub. No.: WO2021/049495
PCT Pub. Date: Mar. 18, 2021

(65) Prior Publication Data
US 2022/0277686 A1    Sep. 1, 2022

(30) Foreign Application Priority Data

Sep. 11, 2019  (JP) ................................. 2019-165324

(51) Int. Cl.
*G09G 3/20*   (2006.01)
*A63F 13/25*  (2014.01)
*A63F 13/52*  (2014.01)

(52) U.S. Cl.
CPC .......... *G09G 3/2096* (2013.01); *A63F 13/25* (2014.09); *A63F 13/52* (2014.09);
(Continued)

(58) Field of Classification Search
None
See application file for complete search history.

(56) References Cited

U.S. PATENT DOCUMENTS 10,931,913 B2    2/2021   Tanikawa
2018/0061364 A1  3/2018   Cook
(Continued)

FOREIGN PATENT DOCUMENTS

WO    2017179230 A1    10/2017

OTHER PUBLICATIONS

International Search Report for corresponding PCT Application No. PCT/JP2020/033984, 4 pages, dated Dec. 1, 2020.
(Continued)

*Primary Examiner* — Nicholas R Wilson
(74) *Attorney, Agent, or Firm* — Matthew B. Dernier, Esq.

(57) ABSTRACT

A display control apparatus, a transmission apparatus, a display control method, and a program that enable an image display time interval at the display control apparatus, which is connected to the transmission apparatus through a network, to properly follow an image rendering time interval at the transmission apparatus. A data reception section sequentially receives image data indicating an image associated with rendering time data capable of determining an image rendering time for the image in a cloud server. A display timing determination section determines, based on the rendering time data, a display timing of the image indicated by the image data. A display control section controls display of the image in accordance with the determined display timing.

13 Claims, 8 Drawing Sheets

(52) U.S. Cl.
CPC . *G09G 2310/08* (2013.01); *G09G 2320/0252* (2013.01); *G09G 2370/02* (2013.01)

(56) References Cited

U.S. PATENT DOCUMENTS

2019/0164518 A1   5/2019   Dimitrov
2019/0356880 A1   11/2019  Tanikawa

OTHER PUBLICATIONS

Notice of Reasons for Refusal for corresponding JP Application No. 2021-545552, 8 pages, dated Nov. 2, 2022.

DISPLAY CONTROL APPARATUS, TRANSMISSION APPARATUS, DISPLAY CONTROL METHOD, AND PROGRAM

TECHNICAL FIELD

The present invention relates to a display control apparatus, a transmission apparatus, a display control method, and a program.

BACKGROUND ART

Technologies for cloud gaming services, which have attracted attention in recent years, are used in a cloud server to render an image indicating the play status of a game. The rendered image is encoded to obtain image data. The resulting encoded image data is transmitted from the cloud server to a terminal. Eventually, the terminal displays an image obtained by decoding the encoded image data. As this series of processing is repeatedly performed, the terminal displays a video image indicating the play status of the game.

Further, when a required processing capacity varies with contents of a scene in each frame as in the case of game screen rendering, the time required for rendering does not remain constant. This results in a variable frame rate. Problems occur in a case where a game with a variable frame rate is to be displayed on a display with a conventionally common constant frame rate. More specifically, for example, the results of rendering are not immediately reflected or some frames are left undisplayed. In order to cope with such situations, there exists a display panel for display at a variable frame rate.

SUMMARY

Technical Problems

For communication of a video image requiring real-time processing, such as a video image indicating the play status of a game, it is desirable that latency before a terminal displays an image be low. It is also desirable that an image rendering time interval between frames in the cloud server be reproduced when the image is displayed at the terminal connected to the cloud server through a network.

However, the resulting latency varies with the amount of load imposed by processing for encoding and decoding and with an actual environment of communication between the cloud server and the terminal. Therefore, an image display time interval at the terminal cannot be made to follow the image rendering time interval at the cloud server simply by allowing the terminal to perform a display operation in accordance with image reception.

The present invention has been made in view of the above circumstances. An object of the present invention is to provide a display control apparatus, a transmission apparatus, a display control method, and a program that enable the image display time interval at the display control apparatus, which is connected to the transmission apparatus through a network, to properly follow the image rendering time interval at the transmission apparatus.

Solution to Problems

In order to solve the above problems, a display control apparatus according to the present invention includes a reception section, a display timing determination section, and a display control section. The reception section sequentially receives, from a transmission apparatus, image data indicative of an image that is associated with rendering time data capable of determining an image rendering time for the image in the transmission apparatus. The display timing determination section determines, based on the rendering time data, a display timing of the image indicated by the image data. The display control section controls display of the image in accordance with the determined display timing.

According to an aspect of the present invention, based further on latency or cumulative error data, the display timing determination section determines the display timing. The cumulative error data indicates a cumulative error between a timing at which an image should be displayed and a timing at which the image is actually displayed.

Further, according to an aspect of the present invention, the reception section receives the image data that is further associated with at least one of a frame number, encoding time data, or transmission start timing data. The encoding time data is capable of determining the time spent on encoding. The transmission start timing data indicates a transmission timing of the image data. The display control section controls the display of the image based further on at least one of a frame number, the encoding time data, or the transmission start timing data.

Furthermore, according to an aspect of the present invention, in a case where the display control apparatus does not support a variable frame rate and displays images at a constant frame rate, the display control section displays the image at a vertical synchronization timing closest to the display timing.

Moreover, according to an aspect of the present invention, the display control apparatus further includes a statistical data generation section and a tolerable latency determination section. The statistical data generation section generates statistical data indicative of latency statistics on a plurality of pieces of the image data. The tolerable latency determination section determines tolerable latency in accordance with the statistical data. The display control section exercises control, based on whether or not the tolerable latency is exceeded by the latency of a newly received piece of the image data, so as to determine whether to display or discard an image indicated by the newly received piece of the image data.

In the above aspect, the display control apparatus may further include a change instruction transmission section. In a case where a predetermined condition is satisfied by the determined tolerable latency, the change instruction transmission section transmits an instruction for changing a data rate to the transmission apparatus.

In the above case, the change instruction transmission section may transmit an instruction for decreasing the data rate to the transmission apparatus in a case where a predetermined latency is exceeded by the determined tolerable latency.

Further, in a case where the determined tolerable latency is lower than a predetermined latency, the change instruction transmission section may transmit an instruction for increasing the data rate to the transmission apparatus.

Further, a transmission apparatus according to the present invention includes an acquisition section, an encoding processing section, and a transmission section. The acquisition section acquires an image rendered in a frame buffer. The encoding processing section generates image data by encoding the acquired image. The transmission section transmits the image data associated with rendering time data capable of determining an image rendering time to a terminal that displays the acquired image.

According to an aspect of the present invention, the transmission section transmits the image data that is further associated with at least one of a frame number, encoding time data, or transmission start timing data. The encoding time data is capable of determining the time spent on encoding. The transmission start timing data indicates a transmission timing of the image data.

In the above aspect, the transmission section may transmit the image data that is associated with a history of at least one of the rendering time data, a frame number, the encoding time data, or the transmission start timing data.

Further, a display control method according to the present invention includes: a step of sequentially receiving, from a transmission apparatus, image data indicative of an image that is associated with rendering time data capable of determining an image rendering time for the image in the transmission apparatus; a step of determining, based on the rendering time data, a display timing of the image indicated by the image data; and a step of controlling display of the image in accordance with the determined display timing.

Moreover, a program according to the present invention causes a computer to execute: a procedure of sequentially receiving, from a transmission apparatus, image data indicative of an image that is associated with rendering time data capable of determining an image rendering time for the image in the transmission apparatus; a procedure of determining, based on the rendering time data, a display timing of the image indicated by the image data; and a procedure of controlling display of the image in accordance with the determined display timing.

DESCRIPTION OF EMBODIMENT

Figure 1:
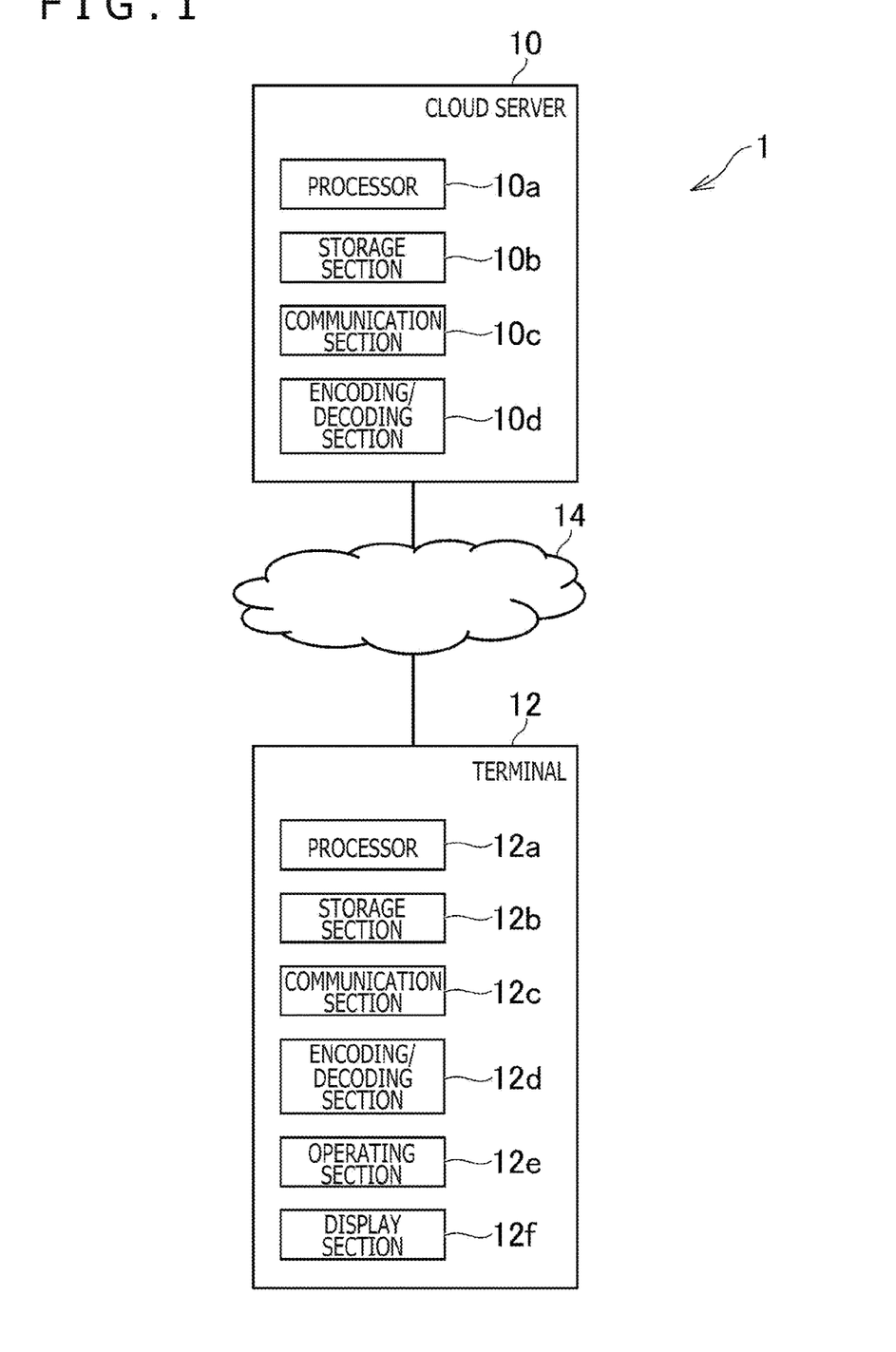
FIG. 1 is a diagram illustrating an example overall configuration of a cloud gaming system according to an embodiment of the present invention.

FIG. 1 is a diagram illustrating an example overall configuration of a cloud gaming system 1 according to an embodiment of the present invention. As illustrated in FIG. 1, the cloud gaming system 1 according to the present embodiment includes a cloud server 10 and a terminal 12. The cloud server 10 and the terminal 12 are each centered around a computer. The cloud server 10 and the terminal 12 are connected to a computer network 14, such as the Internet, so that the cloud server 10 and the terminal 12 are able to communicate with each other.

The cloud server 10 according to the present embodiment is, for example, a server computer that executes a program for a game using a cloud gaming service. The cloud server 10 delivers a video image indicative of the play status of the game to the terminal 12 that is used by a user playing the game.

As depicted in FIG. 1, the cloud server 10 includes, for example, a processor 10a, a storage section 10b, a communication section 10c, and an encoding/decoding section 10d.

The processor 10a is, for example, a program control device such as a central processing unit (CPU) and performs various information processes in accordance with a program stored in the storage section 10b. The processor 10a according to the present embodiment additionally includes a graphics processing unit (GPU) that renders an image in a frame buffer in accordance with graphics commands and data supplied from the CPU.

The storage section 10b is, for example, a storage element such as a read only memory (ROM) or a random access memory (RAM), or a solid-state drive (SSD). The storage section 10b stores, for example, the program to be executed by the processor 10a. Further, the storage section 10b according to the present embodiment is provided with a region of the frame buffer in which an image is rendered by the GPU included in the processor 10a.

The communication section 10c is, for example, a communication interface that is used to transmit and receive data to and from the terminal 12 or other computer through the computer network 14.

The encoding/decoding section 10d includes, for example, an encoder and a decoder. The encoder encodes an inputted image to generate image data indicative of the inputted image. Meanwhile, the decoder decodes inputted image data to output an image indicated by the inputted image data.

The terminal 12 according to the present embodiment is a game console, a personal computer, a tablet terminal, a smartphone, or other computer used, for example, by a user of the cloud gaming service.

As depicted in FIG. 1, the terminal 12 includes, for example, a processor 12a, a storage section 12b, a communication section 12c, an encoding/decoding section 12d, an operating section 12e, and a display section 12f.

The processor 12a is, for example, a program control device such as a CPU and performs various information processes in accordance with a program stored in the storage section 12b. The processor 12a according to the present embodiment additionally includes a GPU that renders an image in a frame buffer in accordance with graphics commands and data supplied from the CPU.

The storage section 12b is, for example, a storage element such as a ROM or a RAM, or an SSD. The storage section 12b stores, for example, the program to be executed by the processor 12a. Further, the storage section 12b according to the present embodiment is provided with a region of the frame buffer in which an image is rendered by the GPU included in the processor 12a.

The communication section 12c is, for example, a communication interface that is used to transmit and receive data to and from the cloud server 10 or other computer through the computer network 14.

The encoding/decoding section 12d includes, for example, an encoder and a decoder. The encoder encodes an inputted image to generate image data indicative of the inputted image. Meanwhile, the decoder decodes inputted image data to output an image indicated by the inputted image data.

The operating section 12e is, for example, an operating member that is used to perform an operation input to the processor 12a.

The display section 12f is, for example, a display device such as a liquid-crystal display or an organic electroluminescent (EL) display.

It should be noted that the terminal 12 need not include a GPU or a frame buffer.

When the operating section 12e is used to perform an operation related to a game with respect to the terminal 12 according to the present embodiment, an operation signal indicative of the operation is transmitted from the terminal 12 to the cloud server 10. Then, the cloud server 10 performs game processing based on the operation signal. Next, a play image, namely, a frame image indicative of the play status of the game that is affected by the operation signal, is rendered in the frame buffer of the cloud server 10. In the present embodiment, game processing and play image rendering are repeatedly executed.

Subsequently, the cloud server 10 sequentially acquires play images rendered in the frame buffer and generates image data indicative of the play images. Then, the cloud server 10 transmits the generated image data to the terminal 12. Next, the terminal 12 causes the display section 12f to display play images that are generated by decoding the image data received from the cloud server 10. In the above-described manner, the present embodiment causes the display section 12f to display a series of play images.

Figure 2:
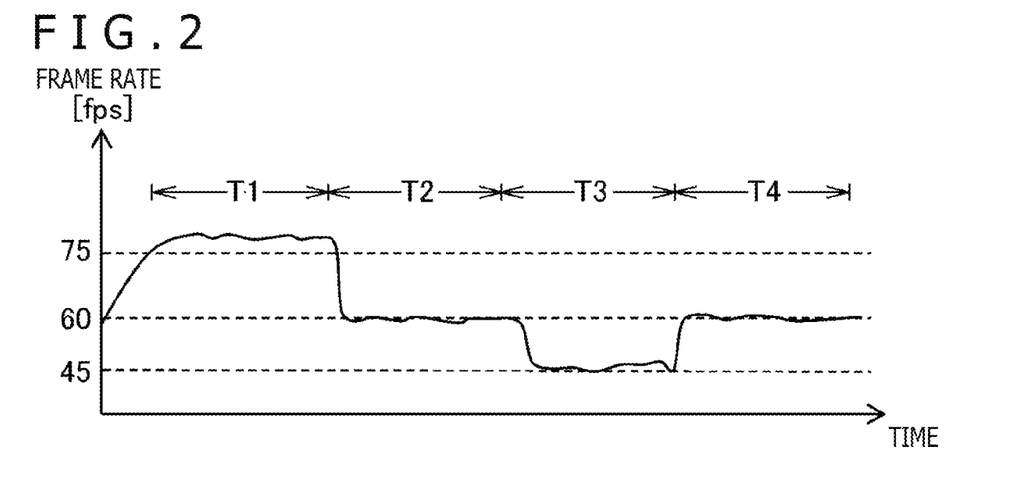
FIG. 2 is a diagram schematically illustrating an example transition of the frame rate of play image rendering that is performed at a variable frame rate.

The terminal 12 according to the present embodiment supports a variable frame rate. In the present embodiment, the play images are rendered and displayed at a variable frame rate. FIG. 2 is a diagram schematically illustrating an example transition of the frame rate of play image rendering that is performed at a variable frame rate.

Period T1 depicted in FIG. 2 is a period during which the play images depict a scene that is subjected to particularly simple rendering processing. During period T1, the play images are rendered at a frame rate of approximately 75 fps. In other words, an inter-frame time interval is approximately 1/75 seconds during period T1.

Periods T2 and T4 depicted in FIG. 2 are periods during which the play images depict a scene that is subjected to rendering processing at a normal level. During periods T2 and T4, the play images are rendered at a frame rate of approximately 60 fps. In other words, the inter-frame time interval is approximately 1/60 seconds during periods T2 and T4.

Period T3 depicted in FIG. 2 is a period during which the play images depict a scene that is subjected to particularly complex rendering processing. During period T3, the play images are rendered at a frame rate of approximately 45 fps. In other words, the inter-frame time interval is approximately 1/45 seconds during period T3.

As depicted in FIG. 2, the frame rate of play image rendering varies, for example, with the complexity of rendering processing for a scene depicted by the play images. Thus, the terminal 12 needs to reproduce a state where the frame rate of rendering, that is, a display interval, varies in the cloud server 10.

If the frame rate of rendering in the cloud server 10 varies as indicated in FIG. 2, it is conceivable that the cloud server 10 and the terminal 12 may perform encoding, transmission, decoding, and displaying at a mutually-agreed constant frame rate of 60 fps (i.e., the inter-frame time interval is 1/60 seconds). It is also conceivable that the display section 12f in the present embodiment may be a display supporting only a conventional constant frame rate. In such a case, control is simple and easy, but the number of times new image data can be transmitted is limited to a factor of the constant frame rate. In other words, the frame rate is limited to 60 fps during period T1, and limited to 30 fps during period T3. Further, during period T3, it is possible that image data on images having the same rendering result may be repeatedly transmitted.

Figure 3:
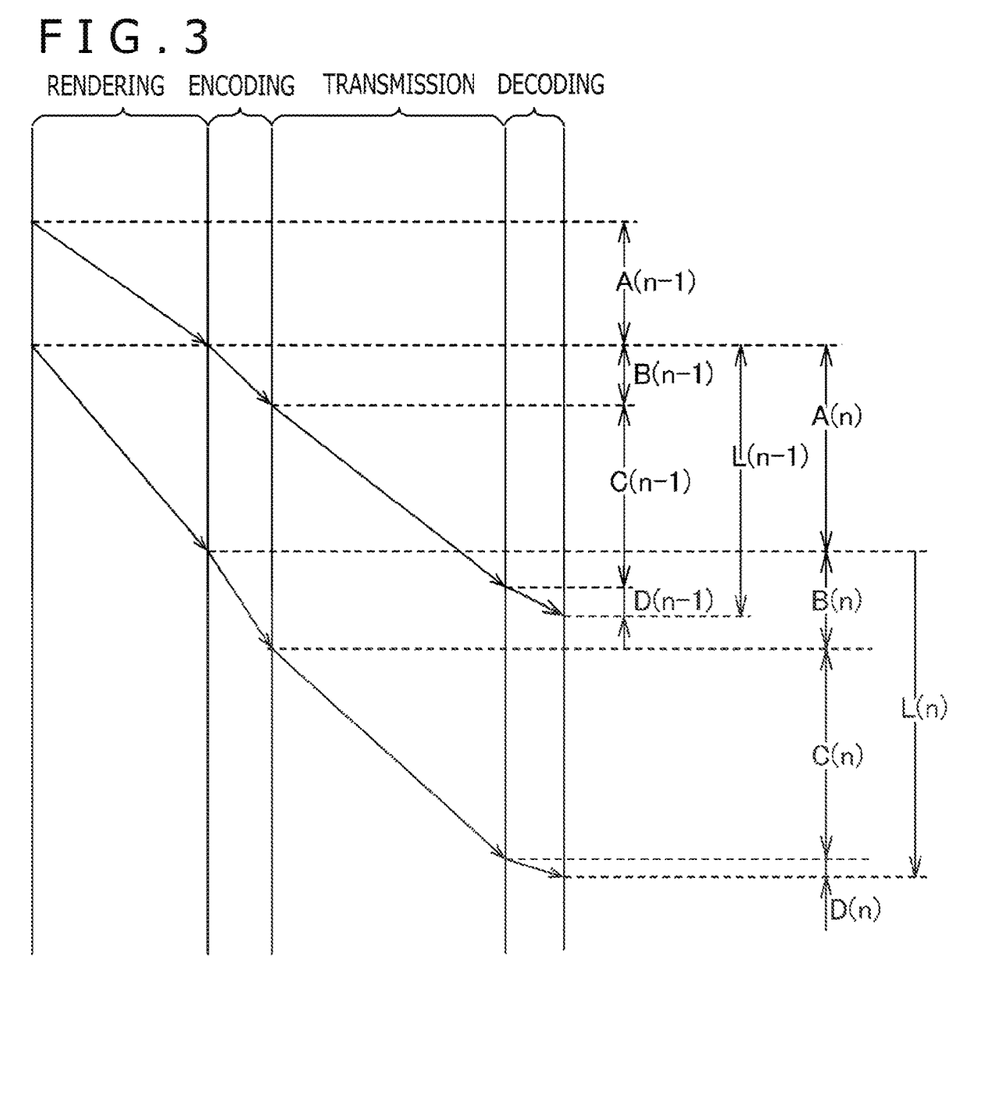
FIG. 3 is a diagram schematically illustrating example sequences from rendering of play images in a frame buffer in a cloud server to displaying of the play images at a terminal.

FIG. 3 is a diagram schematically illustrating example sequences from rendering of play images in the frame buffer in the cloud server 10 to displaying of the play images at the terminal 12. FIG. 3 illustrates an example sequence for a play image in the (n−1)th frame and an example sequence for a play image in the nth frame.

In the examples of FIG. 3, the time spent on the rendering of a play image is marked A, the time spent on the encoding of the play image (generation of image data) is marked B, the time spent on the transmission of the generated image data is marked C, and the time spent on the decoding of the image data is marked D.

Further, the latency of the play image is marked L. In the present embodiment, it is assumed that the latency L is the sum of time B spent on the encoding, time C spent on the transmission, and time D spent on the decoding.

Furthermore, in FIG. 3, the above-mentioned time A, time B, time C, time D, and time L regarding the (n−1)th frame are expressed respectively as A(n−1), B(n−1), C(n−1), D(n−1), and L(n−1). Moreover, the above-mentioned time A, time B, time C, time D, and time L regarding the nth frame are expressed respectively as A(n), B(n), C(n), D(n), and L(n). Here, $L(n-1)=B(n-1)+C(n-1)+D(n-1)$, and $L(n)=B(n)+C(n)+D(n)$.

In the present embodiment, for example, the cloud server 10 transmits, to the terminal 12, image data associated with a frame number, rendering time data, encoding time data, and transmission start timing data.

In the above instance, the rendering time data is, for example, data capable of determining the above-mentioned time A. The rendering time data may be, for example, data representing timestamps of the start and end of rendering or data representing the time actually spent on rendering.

Further, at the beginning of rendering of a play image, the processor 10a in the cloud server 10 according to the present embodiment determines, based, for example, on the complexity of rendering processing, an elapsed time between the timing of a scene depicted by the play image and the timing of a scene depicted by a play image in an immediately preceding frame. Then, the GPU renders a play image depicting a scene at a timing that is later by the determined elapsed time than the timing of the scene depicted by the play image in the immediately preceding frame. Consequently, the rendering time data may be data indicating the above-mentioned elapsed time determined by the processor 10a.

The encoding time is, for example, data capable of determining the above-mentioned time B. The encoding time data may be, for example, data representing timestamps of the start and end of encoding or data representing the time actually spent on encoding.

The transmission start timing data is, for example, data indicating the transmission timing of image data. The terminal 12 is capable of determining time C based on the transmission start timing data associated with the image data and on the reception timing of the image data.

Further, the terminal 12 is capable of determining time D by measuring the time spent on decoding.

As described above, the present embodiment is configured such that the terminal 12 is capable of determining time A, time B, time C, and time D. Therefore, the latency L can be determined by the terminal 12. Furthermore, based on time A, the terminal 12 is capable of recognizing the frequency of communication to be established and the frequency of display required at the terminal 12.

Figure 4:
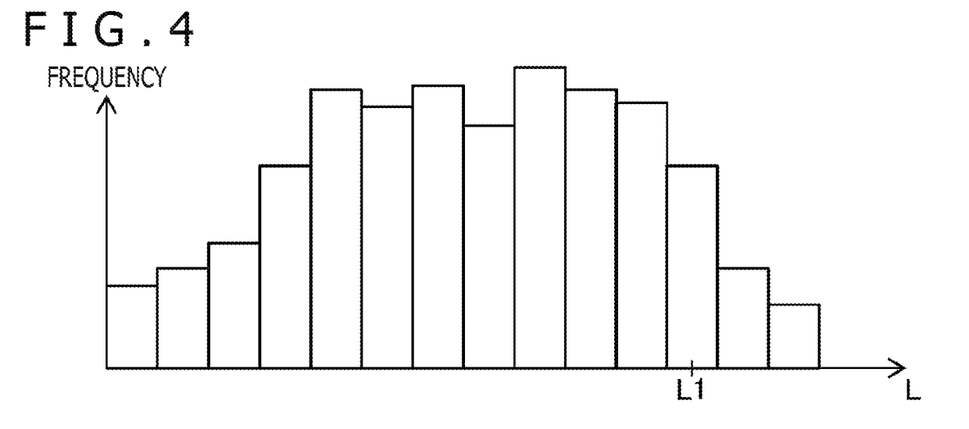
FIG. 4 is a diagram schematically illustrating an example of statistical data.

Furthermore, the present embodiment is configured such that the terminal 12 generates statistical data representing statistics of the latency L. FIG. 4 is a diagram schematically illustrating an example of the statistical data representing the statistics of the latency L, which is determined at the terminal 12. In the present embodiment, based on the latency L of a plurality of frames, which is determined as described above, the terminal 12 generates the statistical data representing the statistics of the latency L. As an example of the statistical data representing the statistics of the latency L, FIG. 4 presents a histogram indicating distribution of the latency L.

As depicted in FIG. 4, occurring latency varies with the amount of load imposed by processing for encoding and decoding and with an actual environment of communication between the cloud server 10 and the terminal 12.

Figure 5:
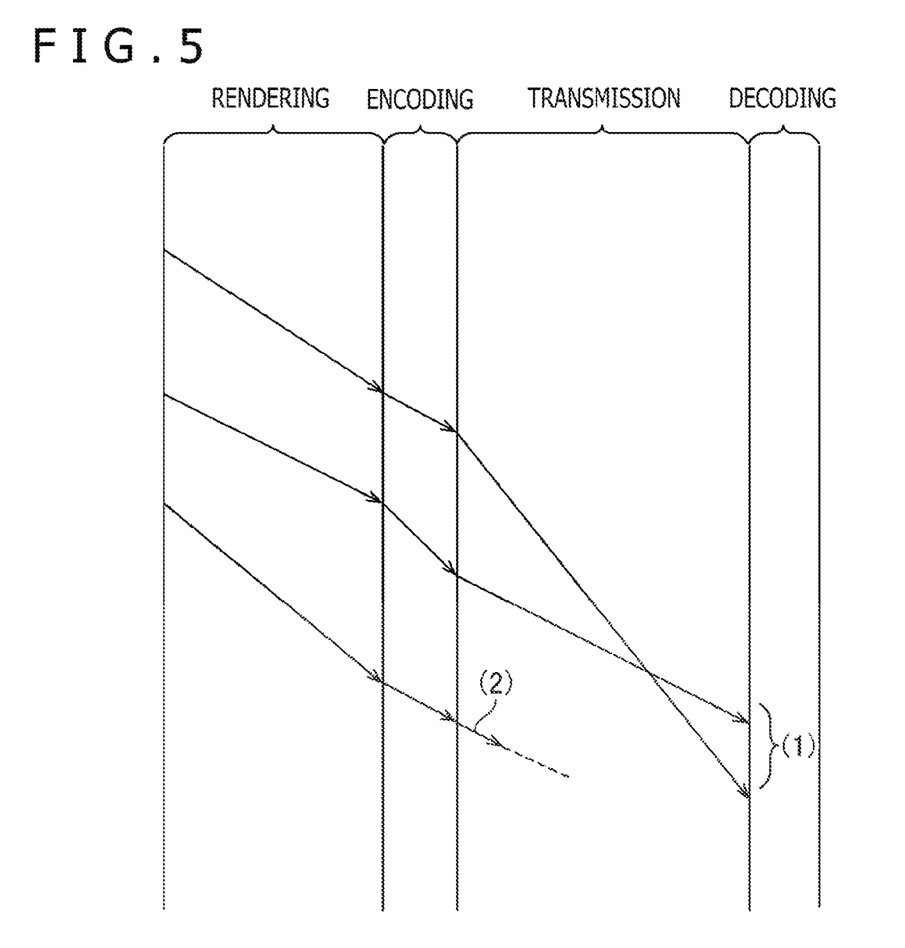
FIG. 5 is a diagram schematically illustrating an example of image data arrival in reverse order and an example of image data loss due to nonarrival.

Further, as indicated at (1) of FIG. 5, image data may arrive in reverse order depending on communication status. In the present embodiment, based on a frame number associated with received image data, the terminal 12 is capable of determining whether or not the order of image data arrival is reversed.

Further, as indicated at (2) of FIG. 5, image data loss may occur due to nonarrival depending on the communication status. In the present embodiment, based on a frame number of the received image data, the terminal 12 is capable of determining whether or not image data loss has occurred due to nonarrival.

For communication of a video image requiring real-time processing, such as a video image indicating the play status of a game, it is desirable that the latency before the terminal 12 displays a play image be low. Therefore, in some cases where the actual time required for the terminal 12 to display the play image is long, better results may be obtained by discarding the play image without displaying it. Further, it is also desirable that an image rendering time interval between frames in the cloud server 10 be reproduced when an image is displayed at the terminal 12.

However, as depicted in FIG. 4, the occurring latency varies with the amount of load imposed by processing for encoding and decoding and with the actual environment of communication between the cloud server 10 and the terminal 12. Therefore, an image display time interval at the terminal 12 cannot be made to follow the image rendering time interval at the cloud server 10, which is connected to the terminal 12 through the computer network 14, simply by allowing the terminal 12 to perform a display operation in accordance with image reception. Further, if play images are indiscriminately discarded in a case where the latency is higher than a fixed value representing a latency control target value, the play images may not properly be discarded depending on the actual environment, or more specifically, for example, the play images to be retained may be inadvertently discarded, or conversely, the play images to be discarded may be left retained. Failure to properly discard play images may also result in the inability of the image display time interval at the terminal 12 to follow the image rendering time interval at the cloud server 10.

In view of the above circumstances, the present embodiment is configured as described below to ensure that the image display time interval at the terminal 12, which is connected to the cloud server 10 through the computer network 14, properly follows the image rendering time interval at the cloud server 10.

Further, the present embodiment is configured as described below to ensure that play images can be properly discarded in accordance with the actual environment by exercising control, based on the statistical data representing the statistics of the latency L, to determine whether to display or discard the play images.

Figure 6:
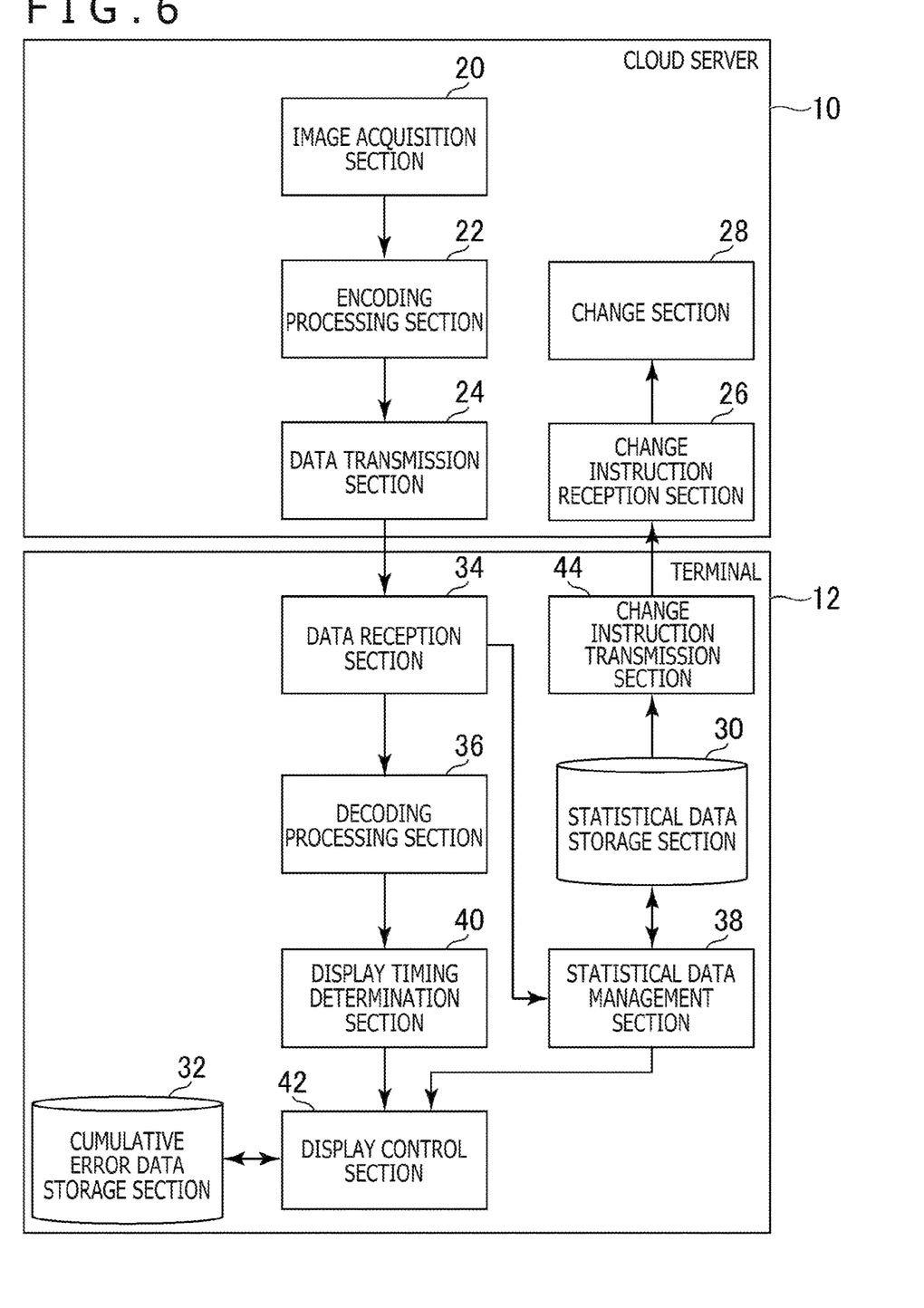
FIG. 6 is a functional block diagram illustrating examples of functions implemented by the cloud gaming system according to the embodiment of the present invention.

FIG. 6 is a functional block diagram illustrating examples of functions implemented by the cloud gaming system 1 according to the present embodiment. It should be noted that the cloud gaming system 1 according to the present embodiment need not implement all the functions depicted in FIG. 6 and may implement functions other than those depicted in FIG. 6.

As depicted in FIG. 6, the cloud server 10 according to the present embodiment functionally includes, for example, an image acquisition section 20, an encoding processing section 22, a data transmission section 24, a change instruction reception section 26, and a change section 28.

The image acquisition section 20 and the encoding processing section 22 are implemented mainly by the encoding/decoding section 10d. The data transmission section 24 and the change instruction reception section 26 are implemented mainly by the communication section 10c. The change section 28 is implemented mainly by the processor 10a.

Further, the above functions are implemented when the processor 10a executes the program that is installed in the cloud server 10, which is a computer, and is provided with commands corresponding to the above functions. The program is supplied to the cloud server 10, for example, through a computer-readable information storage medium such as an optical disk, a magnetic disk, a magnetic tape, a magneto-optical disk, or a flash memory or through a network such as the Internet.

Meanwhile, as depicted in FIG. 6, the terminal 12 according to the present embodiment functionally includes, for example, a statistical data storage section 30, a cumulative error data storage section 32, a data reception section 34, a decoding processing section 36, a statistical data management section 38, a display timing determination section 40, a display control section 42, and a change instruction transmission section 44.

The statistical data storage section 30 and the cumulative error data storage section 32 are implemented mainly by the storage section 12b. The data reception section 34 is implemented mainly by the communication section 12c. The decoding processing section 36 is implemented mainly by the encoding/decoding section 12d. The statistical data management section 38 and the display timing determination section 40 are implemented mainly by the processor 12a. The display control section 42 is implemented mainly by the processor 12a and the display section 12f. The change instruction transmission section 44 is implemented mainly by the processor 12a and the communication section 12c.

Further, the above functions are implemented when the terminal 12 executes the program that is installed in the terminal 12, which is a computer, and is provided with commands corresponding to the above functions. The program is supplied to the terminal 12, for example, through a computer-readable information storage medium such as an optical disk, a magnetic disk, a magnetic tape, a magneto-optical disk, or a flash memory or through a network such as the Internet.

In the present embodiment, the image acquisition section 20 sequentially acquires, for example, images (the play images in the above example) rendered in the frame buffer.

In the present embodiment, the encoding processing section 22 generates, for example, image data by encoding images acquired by the image acquisition section 20.

In the present embodiment, the data transmission section 24 transmits, to the terminal 12, for example, the image data that is generated by the encoding processing section 22 and associated with the above-mentioned rendering time data. The data transmission section 24 may transmit the image data that is further associated with at least one of a frame number, the above-mentioned encoding time data, or the above-mentioned transmission start timing data.

In the present embodiment, the statistical data storage section 30 stores, for example, statistical data that is indicative of latency statistics on a plurality of pieces of image data and illustrated in FIG. 4. In the example of FIG. 4, the latency L is depicted in order from the highest degree to the lowest, and the latency marked L1 represents the degree of latency that is lower than the highest one by a predetermined percentage (e.g., 10%). The value L1 can be determined based on the statistical data. In the present embodiment, the statistical data storage section 30 stores L1 data that represents the value L1.

Further, the statistical data storage section 30 stores reverse occurrence data that indicates the frequency of occurrence of image data arrival in reverse order. Furthermore, the statistical data storage section 30 stores loss occurrence data that indicates the frequency of occurrence of image data loss due to nonarrival.

In the present embodiment, the cumulative error data storage section 32 stores, for example, cumulative error data that indicates a cumulative error between a timing at which an image should be displayed and a timing at which the image is actually displayed. It is assumed that the value E of the cumulative error data is non-negative and is 0 by default.

In the present embodiment, the data reception section 34 sequentially receives, for example, image data that is associated with the rendering time data and transmitted from the data transmission section 24. The data reception section 34 may receive the image data that is further associated with at least one of a frame number, the encoding time data, or the transmission start timing data.

In the present embodiment, the decoding processing section 36 generates, for example, an image by decoding the image data received by the data reception section 34.

In the present embodiment, for example, upon receiving image data, the statistical data management section 38 adds an element indicative of the latency L of the image data to the statistical data stored in the statistical data storage section 30.

Further, the statistical data management section 38 in the present embodiment determines, for example, tolerable latency L2 based on the statistical data stored in the statistical data storage section 30. The tolerable latency L2 is used as a criterion for determining whether to display or discard the image data.

For example, in a case where the value L1 of the L1 data is smaller than a predetermined value L0, the tolerable latency L2 is L0. Meanwhile, in a case where the value L1 of the L1 data is equal to or greater than the predetermined value L0, the tolerable latency L2 is L1. In this manner, the value of the tolerable latency L2 may be set to be not smaller than the predetermined value L0.

Furthermore, based on a frame number associated with the image data received by the data reception section 34, the statistical data management section 38 detects the occurrence of image data arrival in reverse order and the occurrence of image data loss due to nonarrival.

Subsequently, the statistical data management section 38 generates the reverse occurrence data, which indicates the frequency of occurrence of image data arrival in reverse order. Moreover, the statistical data management section 38 generates the loss occurrence data, which indicates the frequency of occurrence of image data loss due to nonarrival.

The statistical data management section 38 calculates, for example, the number of occurrences of image data arrival in reverse order per unit time during a most recent predetermined time period. Then, the statistical data management section 38 sets the calculated number of occurrences as a value M of the reverse occurrence data.

Moreover, the statistical data management section 38 calculates, for example, the number of occurrences of image data loss due to nonarrival per unit time during a most recent predetermined time period. Then, the statistical data management section 38 sets the calculated number of occurrences as a value N of the loss occurrence data.

In the present embodiment, based on the rendering time data, the display timing determination section 40 determines, for example, the display timing of an image generated by the decoding processing section 36. The display timing determination section 40 may determine, based further on the latency L or the cumulative error data, the display timing of the image generated by the decoding processing section 36.

In the present embodiment, based on the determined display timing, the display control section 42 controls, for example, the display of the image generated by the decoding processing section 36. Further, the display control section 42 may control the display of the image based further on at least one of a frame number, the encoding time data, or the transmission start timing data.

Further, the display control section 42 in the present embodiment exercises control, for example, based on whether or not the tolerable latency L2 is exceeded by the latency L of a newly received piece of the image data, so as to determine whether to display or discard an image indicated by the newly received piece of the image data. The display control section 42 exercises control so as, for example, to determine whether the image generated by the decoding processing section 36 is to be discarded or displayed on the display section 12f of the terminal 12.

In the present embodiment, for example, in a case where a predetermined condition is satisfied by the value of the determined tolerable latency L2, the change instruction transmission section 44 transmits an instruction for changing a data rate to the cloud server 10. In a case, for example, where a predetermined latency is exceeded by the determined tolerable latency L2, the change instruction transmission section 44 transmits an instruction for decreasing the data rate to the cloud server 10. Further, in a case, for example, where the determined tolerable latency L2 is lower than the predetermined latency, the change instruction transmission section 44 transmits an instruction for increasing the data rate to the cloud server 10.

In the present embodiment, the change instruction reception section 26 receives, for example, a change instruction transmitted from the change instruction transmission section 44.

In the present embodiment, upon receiving the change instruction, the change section 28 changes, for example, the data rate. The change section 28 changes the data rate by changing, for example, the frequency of frame skipping, an encoding quantization parameter (QP) value, a resolution, a color gamut, or a bit depth.

Referring now to flowcharts depicted in FIGS. 7A and 7B, the following describes an example flow of processing that is performed at the terminal 12 according to the present embodiment when the data reception section 34 receives nth frame image data (hereinafter referred to as the image data (n)).

First of all, the decoding processing section 36 generates a play image (n) by decoding the image data (n) (step S101).

Next, the statistical data management section 38 determines the latency L(n) of the image data (n) and the tolerable latency L2 (step S102). As described above, the tolerable latency L2 is determined based on the L1 data stored in the statistical data storage section 30.

Next, the display timing determination section 40 determines the display timing t1(n) of the play image (n) generated in step S101 (step S103). Here, t1(n) is a timing calculated by the expression t2(n−1)+A(n)−E. It should be noted that t2(n−1) indicates a timing at which a play image (n−1) was actually displayed. The play image (n−1) is a play image that is generated by decoding received image data placed in the immediately preceding frame. Further, A(n) is a time spent on the rendering of the play image (n) as mentioned earlier.

Next, the statistical data management section 38 confirms whether or not the current time is at or after the display timing t1(n) determined in step S103 and the tolerable latency L2 is exceeded by the latency L(n), and whether or not the image data (n) has arrived in reverse order (step S104). For example, in a case where the frame number of the image data (n) is smaller than the frame number of one of pieces of previously received image data, the statistical data management section 38 confirms that the order of image data arrival is reversed.

In a case where it is confirmed that the current time is at or after the display timing t1(n) determined in step S103 and that the tolerable latency L2 is exceeded by the latency L(n) or it is confirmed that the order of image data arrival is reversed (YES at step S104), the display control section 42 discards the image data (n) (step S105).

In a case where it is not confirmed that the current time is at or after the display timing t1(n) determined in step S103 and that the tolerable latency L2 is exceeded by the latency L(n) or it is not confirmed that the order of image data arrival is reversed (NO at step S104), the display control section 42 confirms whether or not the current time is at or after the display timing t1(n) determined in step S105 (step S106).

In a case where the current time is not at or after the display timing t1(n) determined in step S105 (NO at step S106), the display control section 42 waits until the display timing t1(n) comes (step S107). Subsequently, when the display timing t1(n) comes, the display control section 42 causes the display section 12f to display the play image (n). In this case, a timing t2(n) at which the play image (n) is actually displayed is the same as the display timing t1(n).

Meanwhile, in a case where the current time is at or after the display timing t1(n) determined in step S105 (YES at step S106), the display control section 42 causes the display section 12f to immediately display the play image (n) (step S108). In this case, the timing t2(n) at which the play image (n) is actually displayed may be different from the display timing t1(n).

Next, the display control section 42 updates the value of the cumulative error data stored in the cumulative error data storage section 32 (step S109). In this instance, the value E of the cumulative error data stored in the cumulative error data storage section 32 is updated to a value calculated by the expression E+t2(n)−t2(n−1)−A(n). It should be noted that the value E of the cumulative error data may be updated to a value calculated by the expression E+L(n)−L(n−1). In this case, the value E of the cumulative error data is determined based on the latency L. In this manner, the display timing t1(n) may be determined based on the latency L.

Stated differently, in a case where the time (t2(n)−t2(n−1)) elapsed from the timing of play image (n−1) display to the timing of play image (n) display is longer than time A(n) spent on play image (n) rendering, the value E of the cumulative error data increases. Meanwhile, in a case where the time (t2(n)−t2(n−1)) elapsed from the timing of play image (n−1) display to the timing of play image (n) display is shorter than time A(n) spent on play image (n) rendering, the value E of the cumulative error data decreases.

Upon completion of step S104 or S109, the statistical data management section 38 adds an element indicative of the latency L(n) of the play image (n) to the statistical data stored in the statistical data storage section 30 (step S110).

Next, the statistical data management section 38 updates (recalculates) the value L1 of the L1 data determined based on the statistical data to which the element indicative of the latency L(n) has been added. Further, the statistical data management section 38 also updates (recalculates) the value M of the reverse occurrence data and the value N of the loss occurrence data (step S111).

Next, the change instruction transmission section 44 confirms whether or not one of three conditions is satisfied, namely, (a) the value L1 is greater than a predetermined upper limit value Lmax; (b) the value M is greater than a predetermined upper limit value Mmax; or (c) the value N is greater than a predetermined upper limit value Nmax (step S112).

In a case where it is confirmed that one of the above conditions is satisfied (YES at step S112), the change instruction transmission section 44 transmits a data rate decrease signal to the cloud server 10 (step S113). The data rate decrease signal represents the instruction for decreasing the data rate. Then, the change instruction reception section 26 of the cloud server 10 receives the data rate decrease signal. Subsequently, in response to the received data rate decrease signal, the change section 28 decreases the data rate.

Meanwhile, in a case where it is confirmed in step S112 that none of the above conditions are satisfied (NO at step S112), the change instruction transmission section 44 confirms whether or not the value L1 is smaller than a predetermined lower limit value Lmin (step S114). In a case where it is confirmed that the value L1 is smaller than the predetermined lower limit value Lmin (YES at step S114), the change instruction transmission section 44 transmits a data rate increase signal to the cloud server 10 (step S115). The data rate increase signal represents the instruction for increasing the data rate. Then, the change instruction reception section 26 of the cloud server 10 receives the data rate increase signal. Subsequently, in response to the received data rate increase signal, the change section 28 increases the data rate.

In a case where it is confirmed that the value L1 is not smaller than the predetermined lower limit value Lmin (NO at step S114), the processing indicated in step S113 is ended, or the processing indicated in step S115 is ended, the processing depicted in the present example terminates.

Figure 7A:
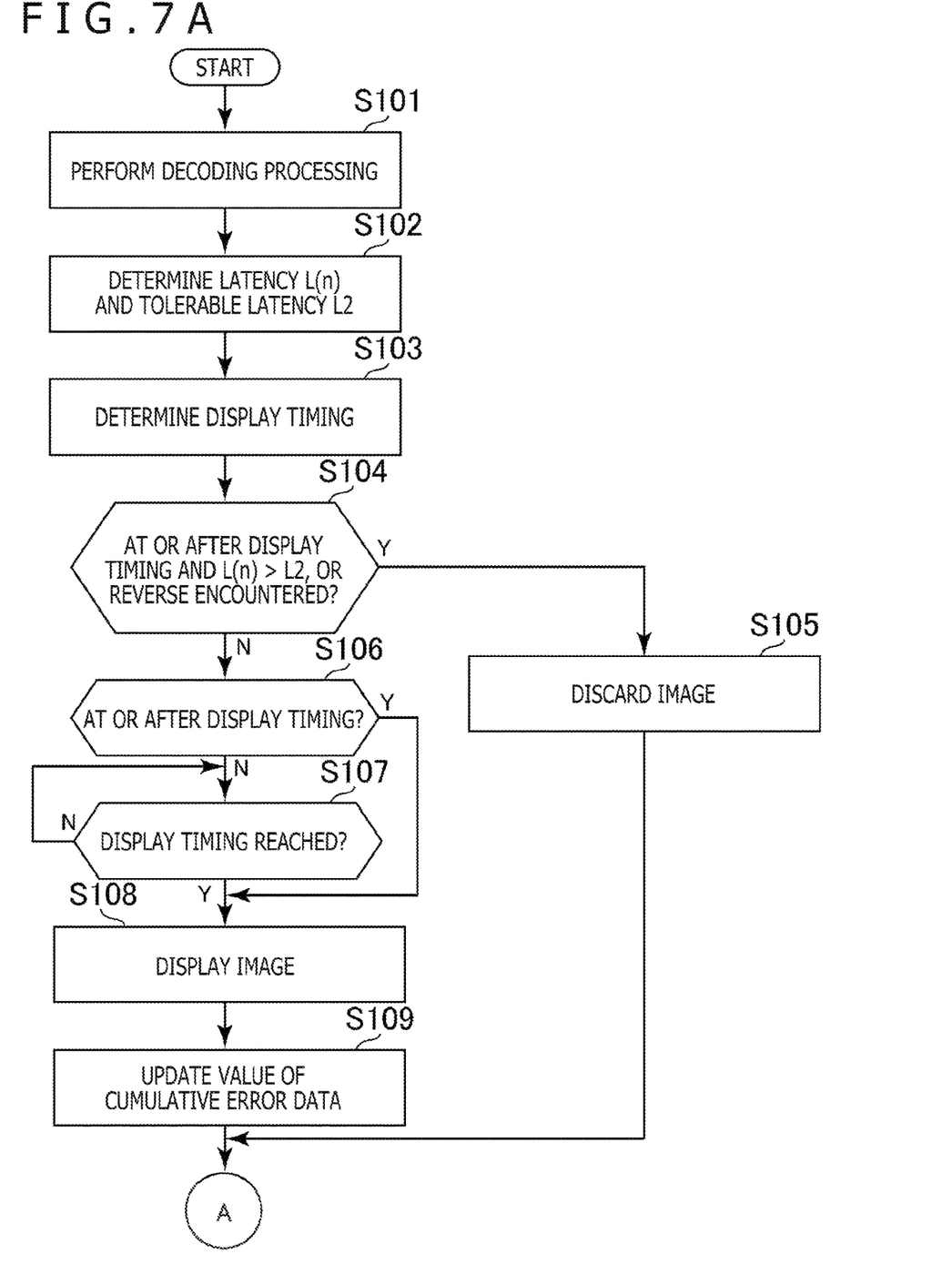
FIG. 7A is a flowchart illustrating an example flow of processing performed at the terminal according to the embodiment of the present invention.
Figure 7B:
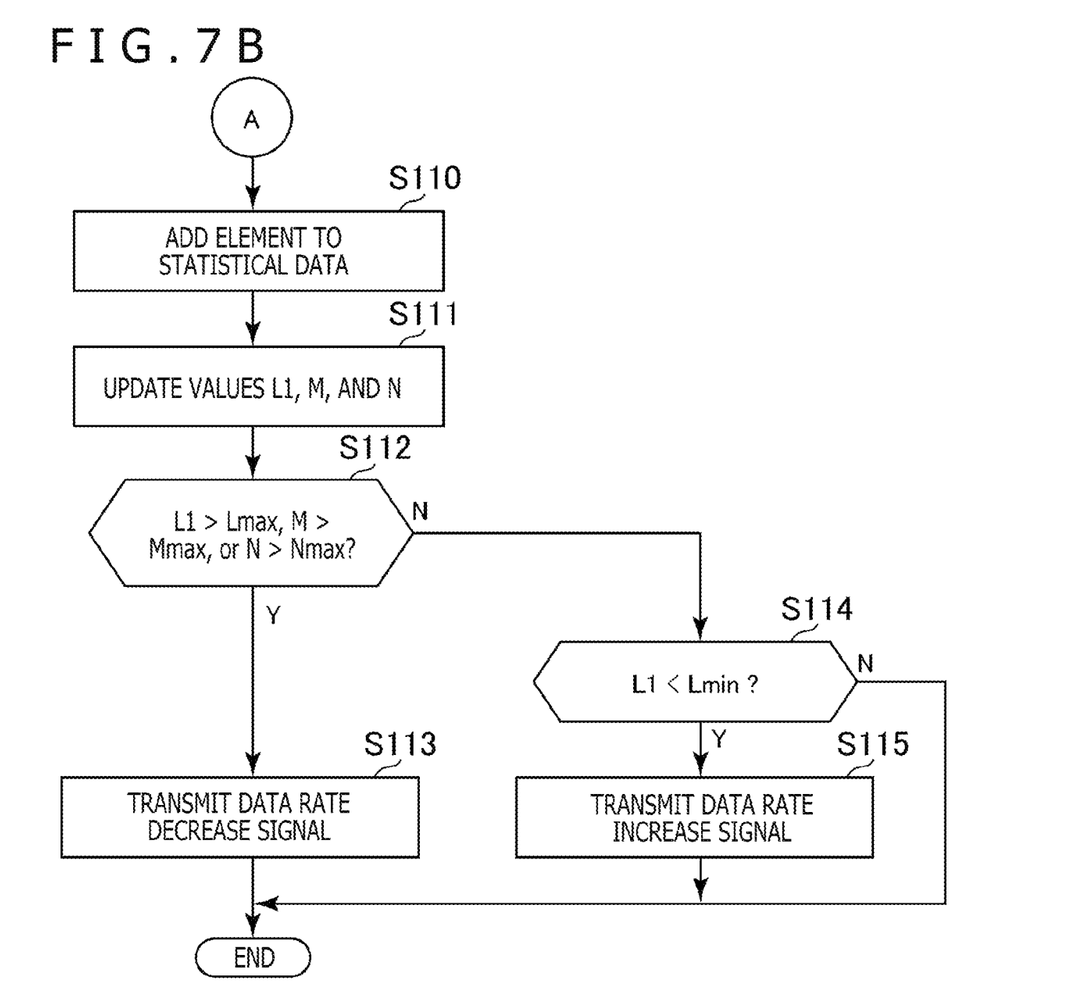
FIG. 7B is a flowchart illustrating the example flow of processing performed at the terminal according to the embodiment of the present invention.

Although an example flow of processing performed when the data reception section 34 receives the image data (n) has been described above, processing similar to the one depicted in FIGS. 7A and 7B is triggered and performed each time the data reception section 34 receives image data.

As described above, in accordance with the tolerable latency L2 determined based on the statistical data, the present embodiment exercises control so as to determine whether to display or discard an image indicated by image data. Therefore, the present embodiment is able to discard play images more properly in accordance with the actual environment than in a case where the play images are indiscriminately discarded when the latency L is higher than a fixed control target value.

Further, as described above, the present embodiment controls the display timing of the play images in such a manner as to minimize the value E of the cumulative error data wherever possible. Therefore, the present embodiment displays the play images at a timing close to the timing at which the play images should be displayed.

Furthermore, even if it is confirmed in step S104 that the current time is at or after the display timing t1(n) determined in step S103 and that the tolerable latency L2 is exceeded by the latency L(n) or it is confirmed that the order of image data arrival is reversed, the processing indicated in steps S106 to S109 may be performed instead of the processing indicated in step S105 as far as a predetermined condition is satisfied. For example, in a case where a scene change from an immediately preceding play image is great, the processing indicated in steps S106 to S109 may be performed. Moreover, images may be displayed in a case, for example, where the order of image data arrival is reversed, the tolerable latency L2 is not exceeded by the latency L(n), and the current time is close to the display timing t1(n) (the current time may be before or after the display timing t1(n) as far as the current time is within a predetermined time range from the display timing t1(n)).

Additionally, in a case where it is confirmed in steps S114 and S115 that the value M is smaller than a predetermined lower limit value Mmin, the change instruction transmission section 44 may transmit the data rate increase signal to the cloud server 10. In addition, in a case where it is confirmed that the value N is smaller than a predetermined lower limit value Nmin, the change instruction transmission section 44 may transmit the data rate increase signal to the cloud server 10. Subsequently, as described above, upon receiving the data rate increase signal, the cloud server 10 may increase the data rate accordingly.

Further, although the frame rate of image data may change as described above in the present embodiment, a sampling rate at which the operation signal indicative of an operation at the operating section 12e is transmitted from the terminal 12 to the cloud server 10 may differ from the frame rate of the image data. Furthermore, the timing of sampling an operation may be asynchronous to a timing at which an image represented by the image data is displayed. Moreover, in the above case, the operation signal may be associated with data such as the frame number of a play image displayed at the timing of operation or a timestamp indicative of the timing of operation.

Additionally, the foregoing description assumes that rendering, encoding, and transmission are performed in units of frame images. However, rendering, encoding, and transmission need not always be performed in units of frame images. The present embodiment is also applicable, for example, to a situation where encoding is performed by using a gradual decoder refresh (GDR) technology and to a situation where encoding and image data transmission are performed by using a slice transfer method that divides a single frame image into a plurality of images for transmission purposes.

Further, the display timing t1(n) may be determined in step S105 to be the timing calculated by the expression $t2(n-1)+A(n)-E$ or the timing calculated by the expression $t2(n-1)+p \times A(n)$, whichever is later. Here, the value p is a dynamically changeable value of 0 or greater but not greater than 1. The value p may be, for example, 0.9. Determining the display timing t1(n) in the above manner makes it possible to avoid an abrupt decrease in the cumulative error.

The present embodiment is applicable to rendering in the cloud server 10 no matter whether it is performed at a variable frame rate or at a constant frame rate.

Furthermore, the terminal 12 need not always support a variable frame rate, and may display play images at a constant frame rate. In such a case, the display control section 42 may display the play image (n) at the timing of vertical synchronization (Vsync) that is closest to the display timing t1(n).

It should be noted that the present invention is not limited to the above-described embodiment.

Further, some or all of the functions of the statistical data storage section 30, the cumulative error data storage section 32, the statistical data management section 38, the display timing determination section 40, and the change instruction transmission section 44 may be implemented in the cloud server 10.

Furthermore, the change instruction transmission section 44 may transmit a data rate change instruction based on an index other than the latency L, for example, the transition of time A and time B of a past predetermined period.

For example, there are some cases where the length of time A tends to decrease (in this case, the frame rate is likely to increase and the data rate is likely to increase) or the length of time B included in the latency L tends to increase (in this case, complex encoding is frequently performed to cause an increased delay). In these cases, for example, the change instruction transmission section 44 may transmit a data rate decrease instruction even if the predetermined latency is not exceeded by the length of the tolerable latency L2.

Further, in preparation for image data loss due to nonarrival and image data arrival in reverse order, for example, the data transmission section 24 may transmit image data that is associated with the history of at least one of the rendering time data, a frame number, the encoding time data, or the transmission start timing data. For example, the data transmission section 24 may transmit image data that is associated with the history of the above data on a past predetermined period. Transmitting the image data in the above manner makes it possible to avoid insufficiency of statistical data that is stored in the statistical data storage section 30.

Furthermore, applicability of the present invention is not limited to the cloud gaming system 1. The present invention is also applicable to a gaming system that includes a server disposed in a home and a terminal connected to the server, for example, through a home network, a public network, or a mobile carrier network. In other words, the computer network 14 may be, for example, a home network, a public network, or a mobile carrier network. Moreover, the server and the terminal may be wiredly or wirelessly connected.

In addition, contents of games to which the present invention is applied are not specifically limited. The present invention is also applicable, for example, to a gaming system executing a game that uses virtual reality (VR) and augmented reality (AR).

Additionally, the foregoing specific character strings and numerical values and the specific character strings and numerical values in the accompanying drawings are merely illustrative and not restrictive. The present invention is not limited to such character strings and numerical values.

The invention claimed is:

1. A display control apparatus comprising:
   a reception section that sequentially receives image data from a transmission apparatus, the image data indicating an image associated with rendering time data, the rendering time data being capable of determining an image rendering time for the image in the transmission apparatus;
   a display timing determination section that determines, based on the rendering time data, a display timing of the image indicated by the image data; and
   a display control section that controls display of the image in accordance with the determined display timing; wherein
   the image data includes transmission start timing data and the reception section determines time spent on transmission using the transmission start timing data.

2. The display control apparatus according to claim 1, wherein the display timing determination section determines the display timing based further on latency or cumulative error data, the cumulative error data indicating a cumulative error between a timing at which an image should be displayed and a timing at which the image is actually displayed.

3. The display control apparatus according to claim 1, wherein the reception section receives the image data that is further associated with at least one of a frame number, encoding time data, or transmission start timing data, the encoding time data being capable of determining a time spent on encoding, the transmission start timing data indicating a transmission timing of the image data, and
   the display control section controls the display of the image based further on at least one of a frame number, the encoding time data, or the transmission start timing data.

4. The display control apparatus according to claim 1, wherein, in a case where the display control apparatus does not support a variable frame rate and displays images at a constant frame rate, the display control section displays the image at a vertical synchronization timing closest to the display timing.

5. The display control apparatus according to claim 1, further comprising:
   a statistical data generation section that generates statistical data indicative of latency statistics on a plurality of pieces of the image data; and
   a tolerable latency determination section that determines tolerable latency in accordance with the statistical data,
   wherein the display control section exercises control, based on whether or not the tolerable latency is exceeded by the latency of a newly received piece of the image data, so as to determine whether to display or discard an image indicated by the newly received piece of image data.

6. The display control apparatus according to claim 5, further comprising:
   a change instruction transmission section that, in a case where a predetermined condition is satisfied by the determined tolerable latency, transmits an instruction for changing a data rate to the transmission apparatus.

7. The display control apparatus according to claim 6, wherein, in a case where a predetermined latency is exceeded by the determined tolerable latency, the change instruction transmission section transmits an instruction for decreasing the data rate to the transmission apparatus.

8. The display control apparatus according to claim 6, wherein, in a case where the determined tolerable latency is lower than a predetermined latency, the change instruction transmission section transmits an instruction for increasing the data rate to the transmission apparatus.

9. A transmission apparatus comprising:
   an acquisition section that acquires an image rendered in a frame buffer;
   an encoding processing section that generates image data by encoding the acquired image; and
   a transmission section that transmits the image data associated with rendering time data to a terminal displaying the acquired image, the rendering time data being capable of determining an image rendering time; wherein
   the image data includes transmission start timing data and a reception section of a display apparatus determines time spent on transmission using the transmission start timing data.

10. The transmission apparatus according to claim 9, wherein the transmission section transmits the image data that is further associated with at least one of a frame number, encoding time data, or transmission start timing data, the encoding time data being capable of determining a time spent on encoding, the transmission start timing data indicating a transmission timing of the image data.

11. The transmission apparatus according to claim 10, wherein the transmission section transmits the image data that is associated with a history of at least one of the rendering time data, a frame number, the encoding time data, or the transmission start timing data.

12. A display control method comprising:
    sequentially receiving, from a transmission apparatus, image data indicative of an image associated with rendering time data, the rendering time data being capable of determining an image rendering time for the image in the transmission apparatus;
    determining, based on the rendering time data, a display timing of the image indicated by the image data; and
    controlling display of the image in accordance with the determined display timing; wherein
    the image data includes transmission start timing data and the reception section determines time spent on transmission using the transmission start timing data.

13. A non-transitory, computer readable storage medium containing a program, which when executed by a computer, causes the computer to perform a display control method by carrying out actions, comprising:
    sequentially receiving, from a transmission apparatus, image data indicative of an image associated with rendering time data, the rendering time data being capable of determining an image rendering time for the image in the transmission apparatus;
    determining, based on the rendering time data, a display timing of the image indicated by the image data; and controlling display of the image in accordance with the determined display timing; wherein the image data includes transmission start timing data and the reception section determines time spent on transmission using the transmission start timing data.

\* \* \* \* \*